United States Patent
Lundgren et al.

[11] Patent Number: 5,400,408
[45] Date of Patent: Mar. 21, 1995

[54] HIGH PERFORMANCE STEREO SOUND ENCLOSURE FOR COMPUTER VISUAL DISPLAY MONITOR AND METHOD FOR CONSTRUCTION

[75] Inventors: David A. Lundgren, Mill Valley; William V. Oxford, San Jose, both of Calif.

[73] Assignee: Apple Computer, Inc., Cupertino, Calif.

[21] Appl. No.: 82,217

[22] Filed: Jun. 23, 1993

[51] Int. Cl.$^6$ .............................................. H04R 1/02
[52] U.S. Cl. ...................................... 381/88; 381/159; 381/87
[58] Field of Search ...................... 381/158, 90, 24, 86, 381/87, 88, 159, 160; 248/917, 918; H04N 5/640, 5/64; 524/871

[56] References Cited

U.S. PATENT DOCUMENTS

| | | |
|---|---|---|
| 4,596,305 | 6/1986 | Jagborn .................. 181/151 |
| 5,010,133 | 4/1991 | Seville ................... 524/871 |
| 5,097,513 | 3/1992 | Jordan et al. ........... 381/160 |
| 5,261,006 | 11/1993 | Nieuwendijk et al. ..... 381/159 |

FOREIGN PATENT DOCUMENTS 8912946 12/1989 WIPO ......................... H04N 5/640

*Primary Examiner*—Curtis Kuntz
*Assistant Examiner*—Mark D. Kelly
*Attorney, Agent, or Firm*—Jeffrey J. Brooks

[57] ABSTRACT

A high quality stereophonic sound enclosure system high resolution intended for computer visual display monitors employing cathode ray tubes (CRTs) having a vertical aperture grill, and methods for construction of same. The aperture grill has a natural frequency centered within the musical scale. The stereo speaker system comprises a ported speaker enclosure within which are mounted two conventional cone speaker assemblies. A stereo audio amplifier and control unit for controlling the audio signals delivered to the speakers is mounted within the speaker enclosure. The speaker enclosure is internally mounted within the monitor with a minimum number of attachment members incorporating vibration isolation material to remove vibration components near the natural frequency of the aperture grill. The speaker enclosure is internally reinforced to reduce structural deformations which contribute to airborne transmitted vibration within the monitor housing when the speaker system is operating.

15 Claims, 11 Drawing Sheets

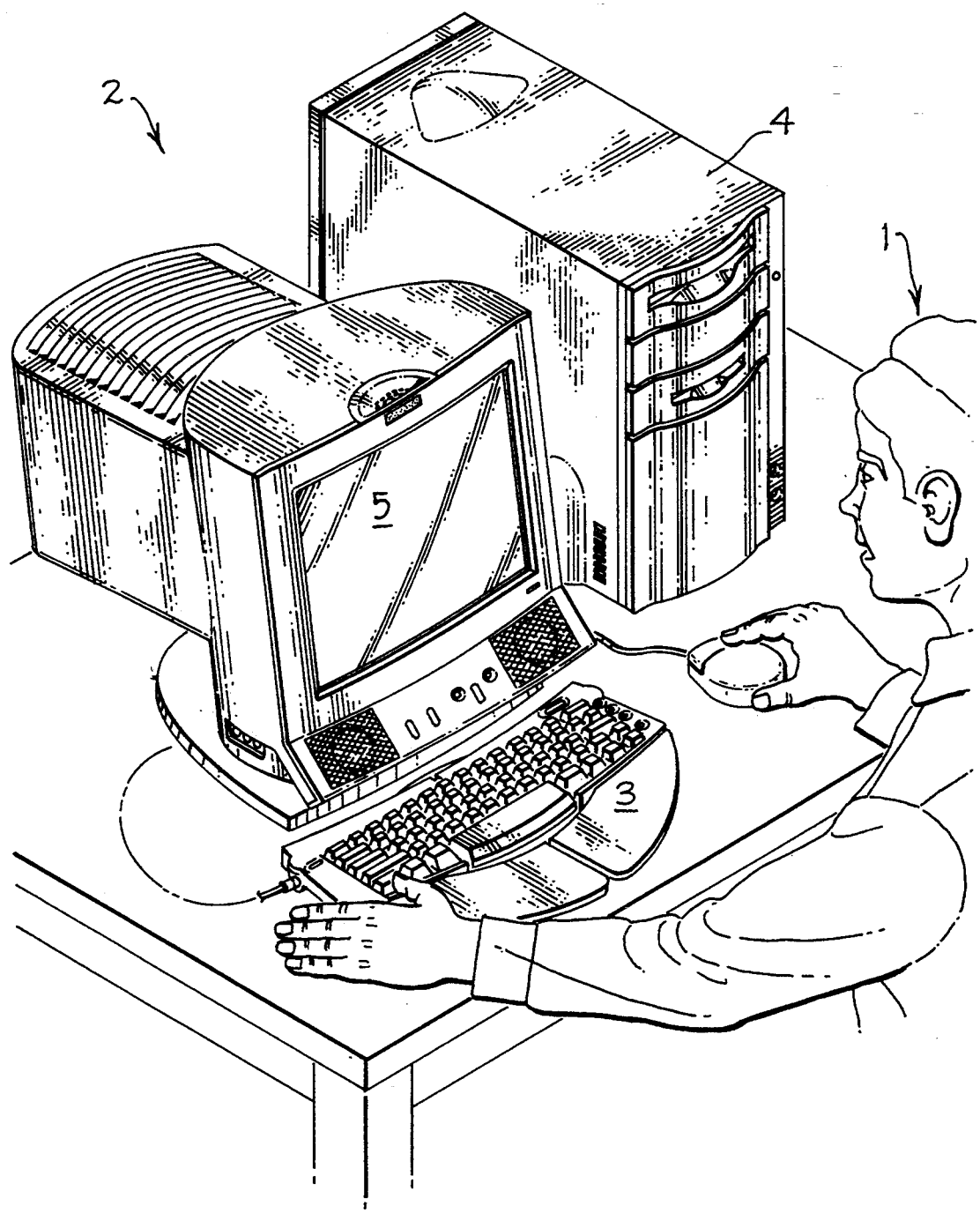
FIG_1A

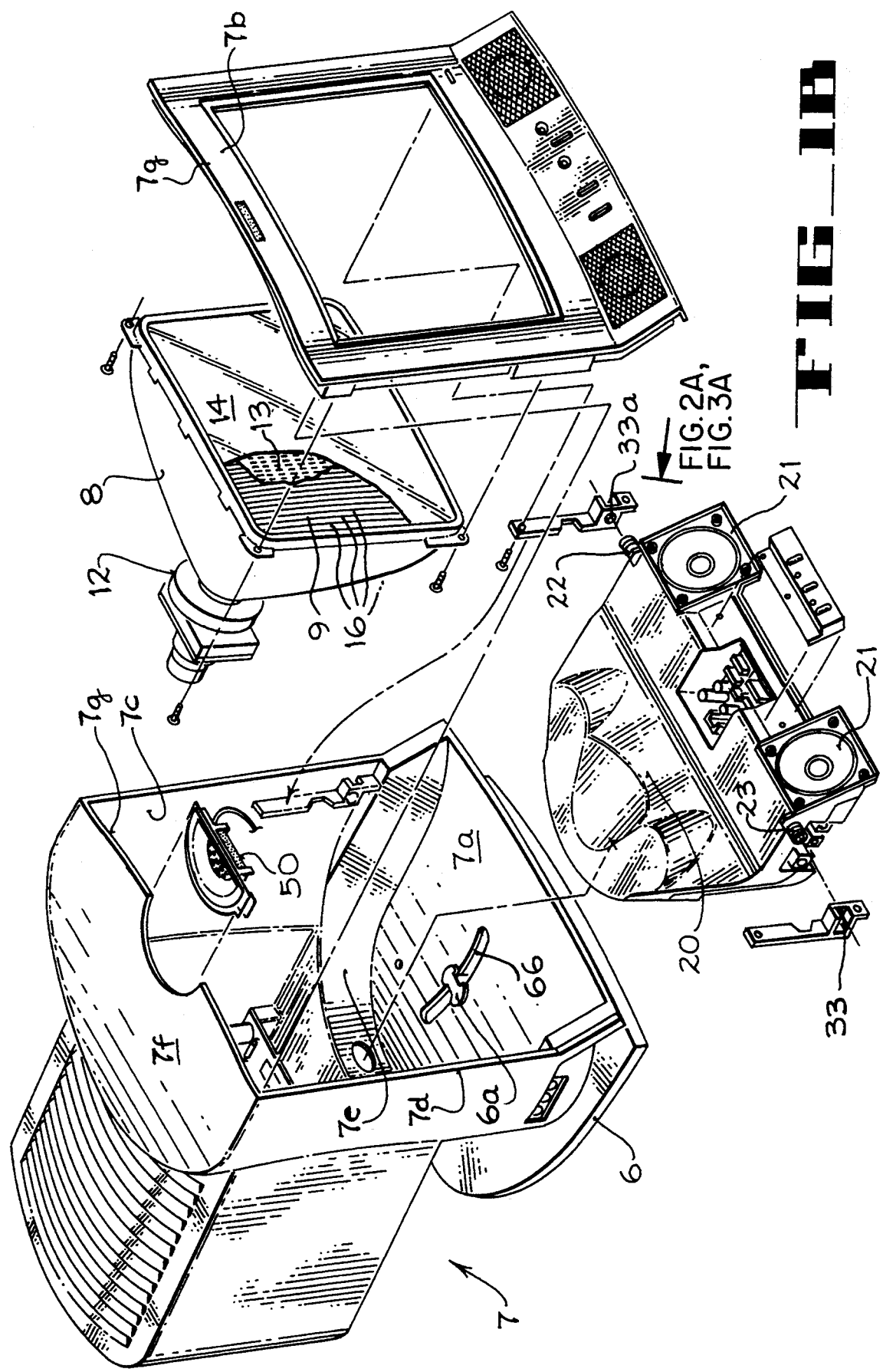

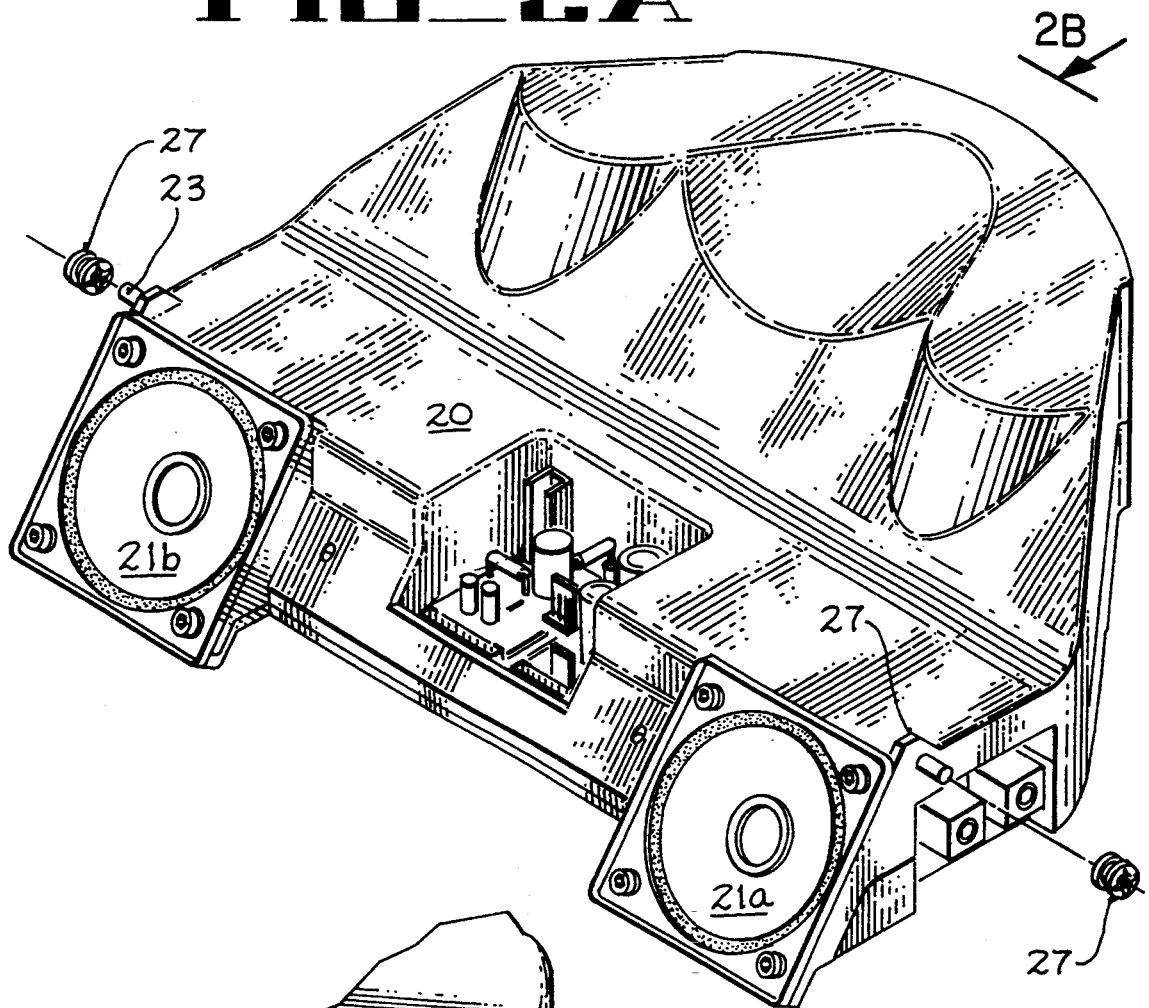
FIG_2A
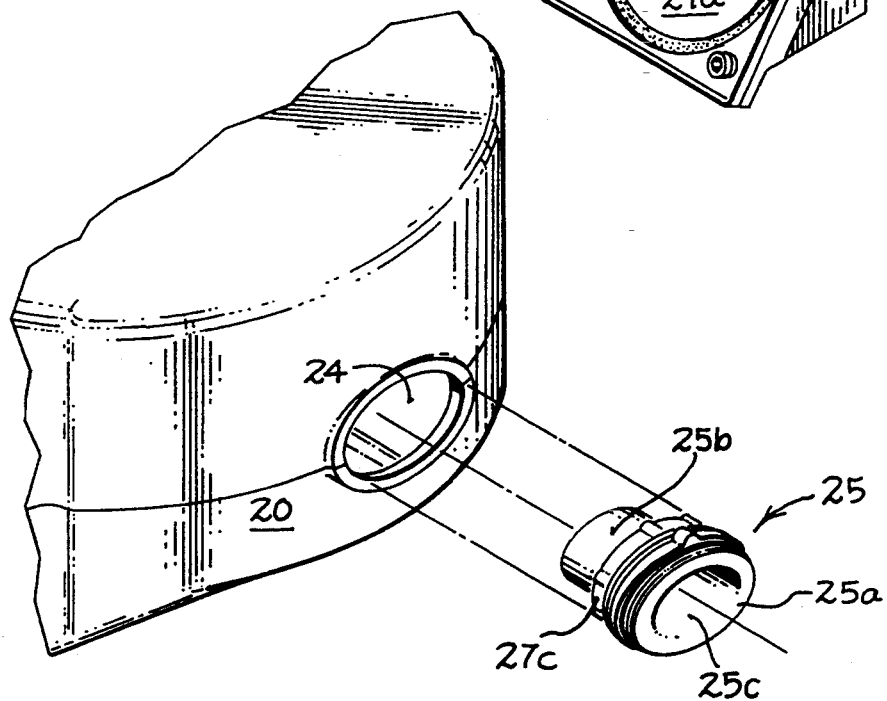
FIG_2B

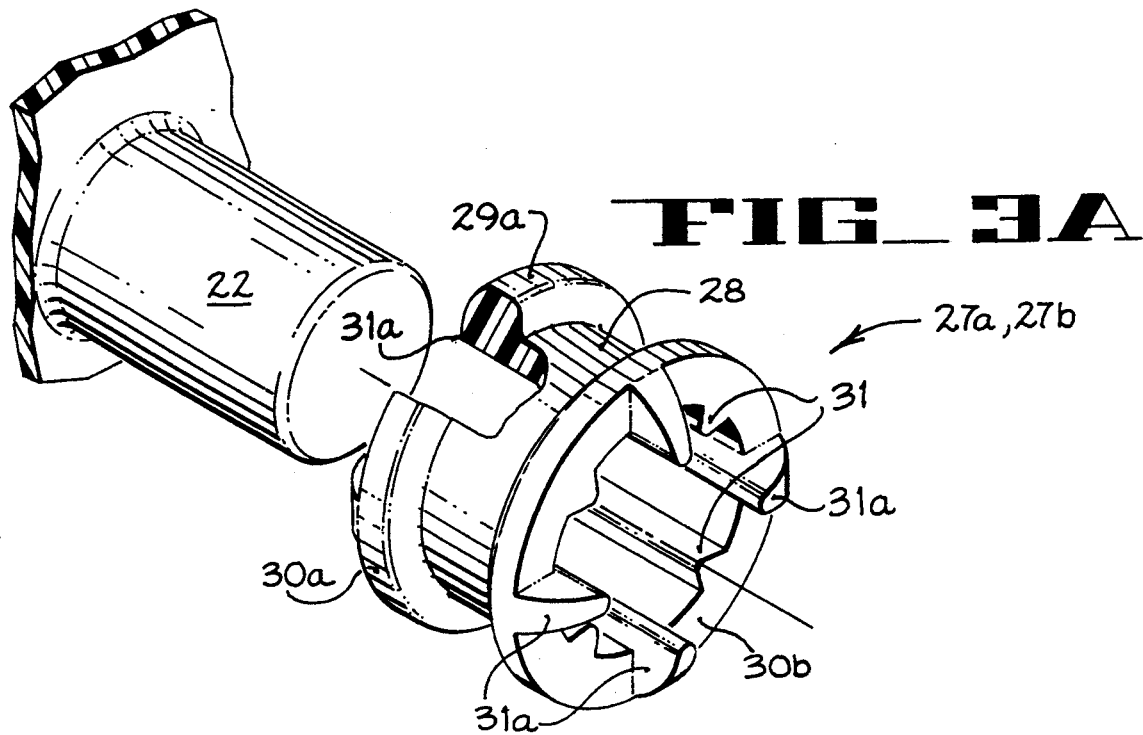
FIG_3A
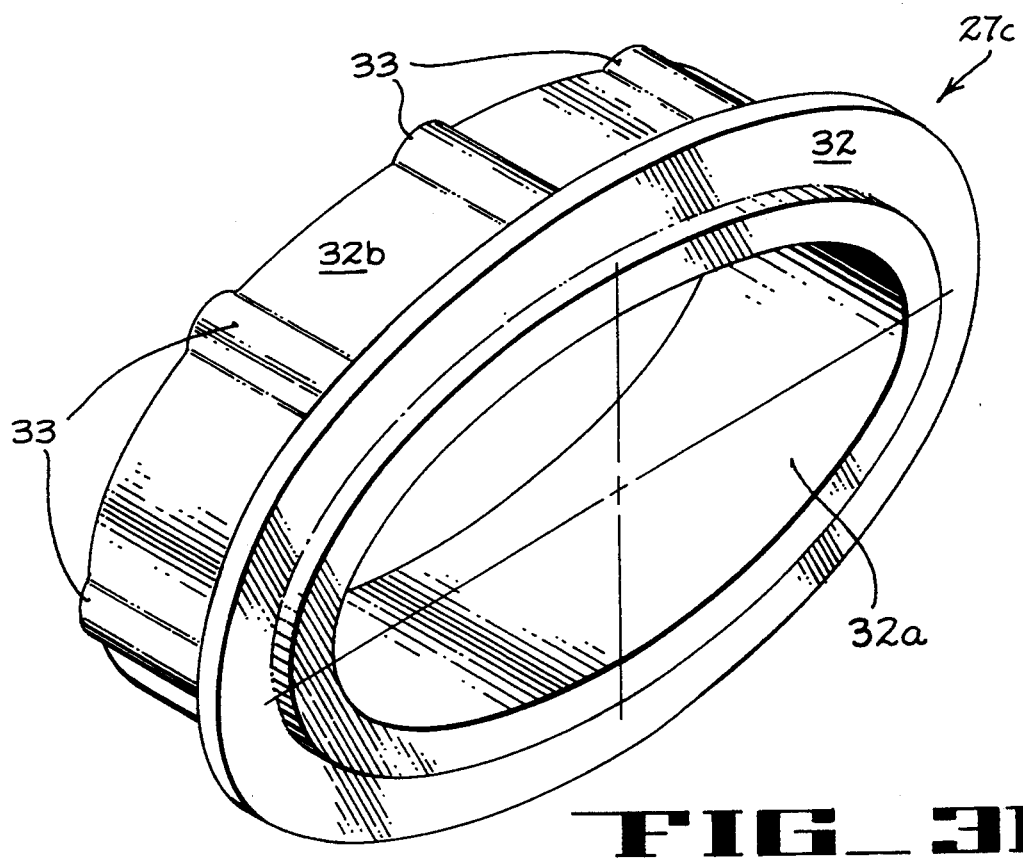
FIG_3B

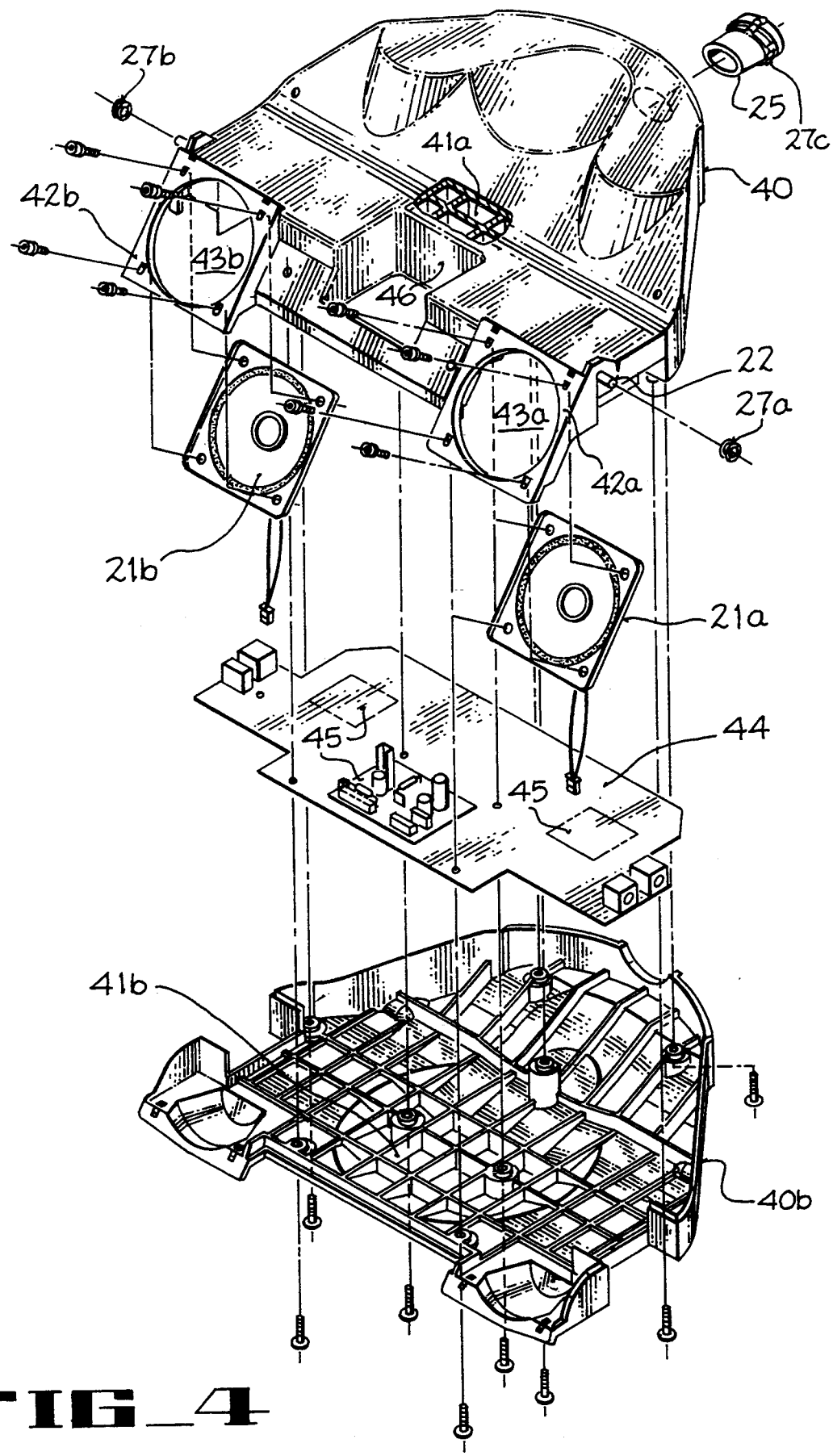
FIG_4

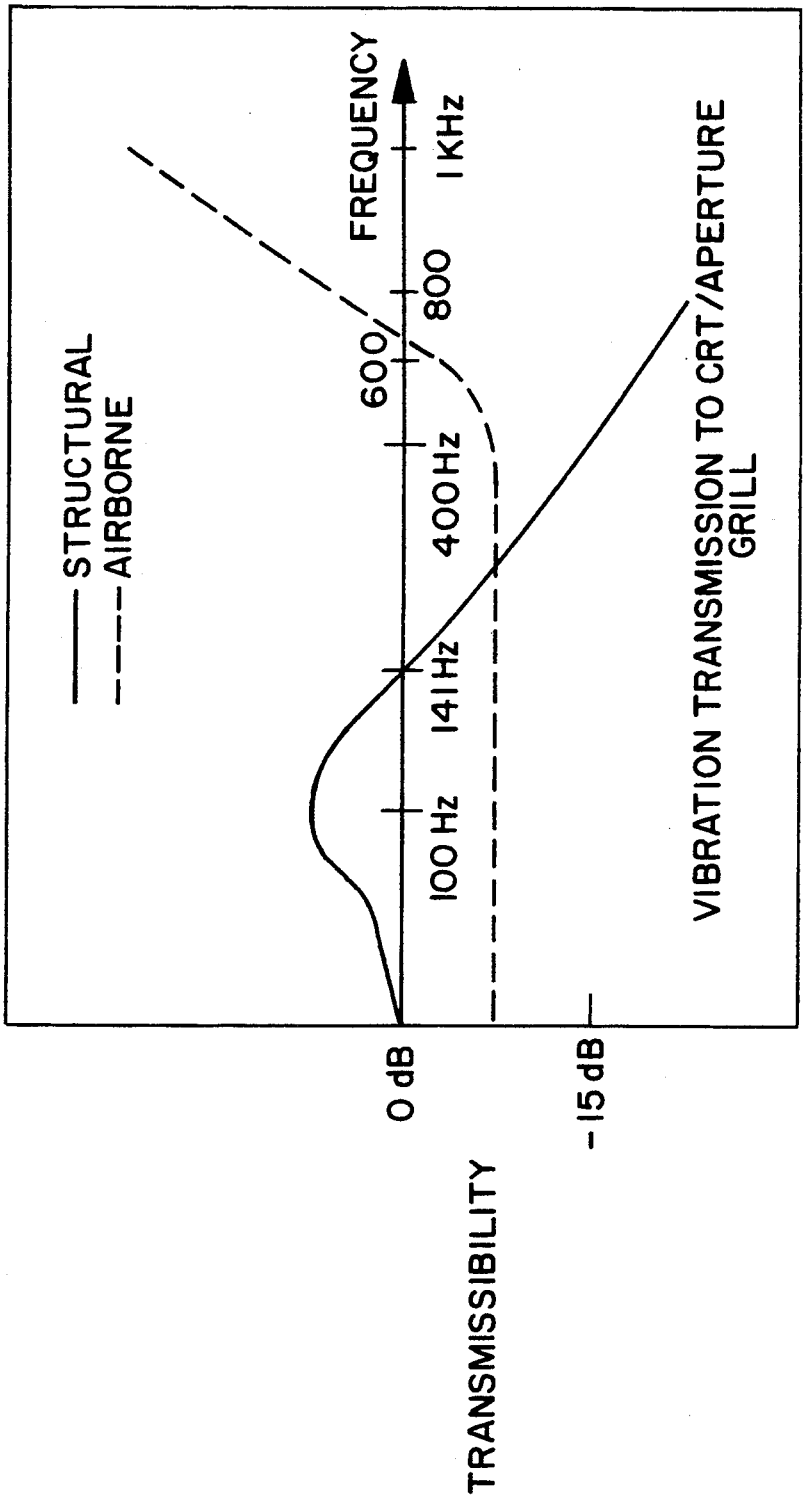
FIG_5A

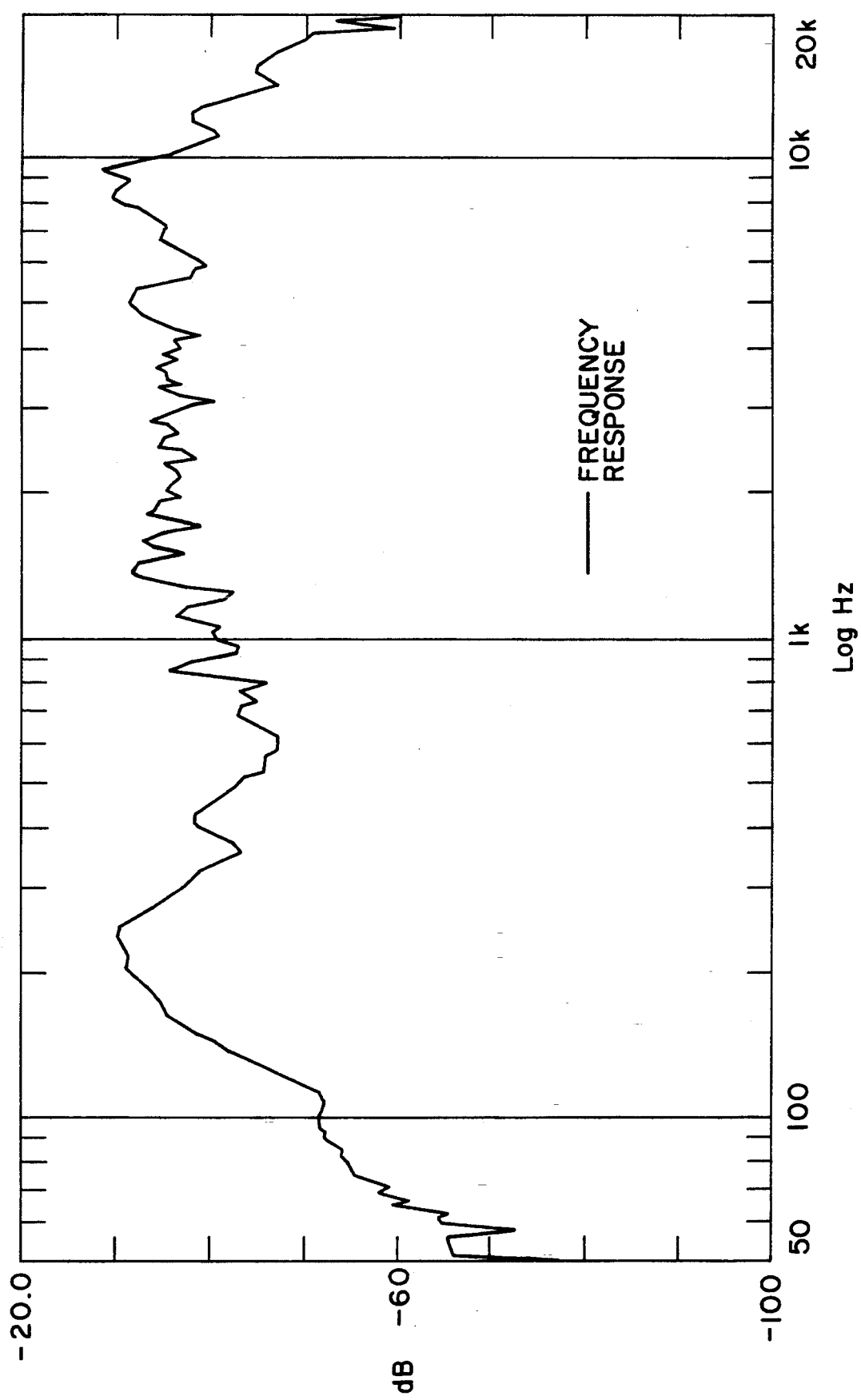

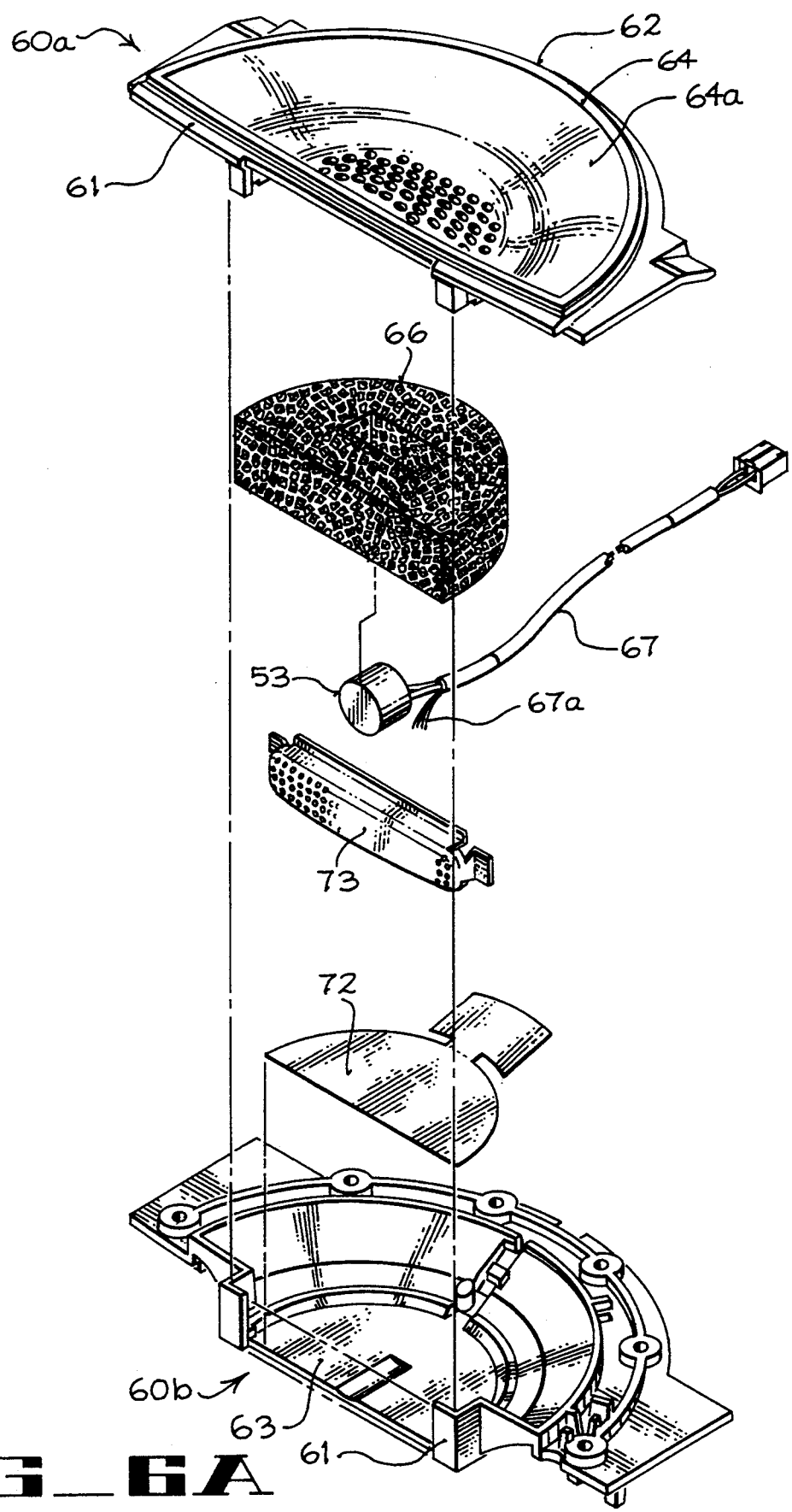
FIG_6A

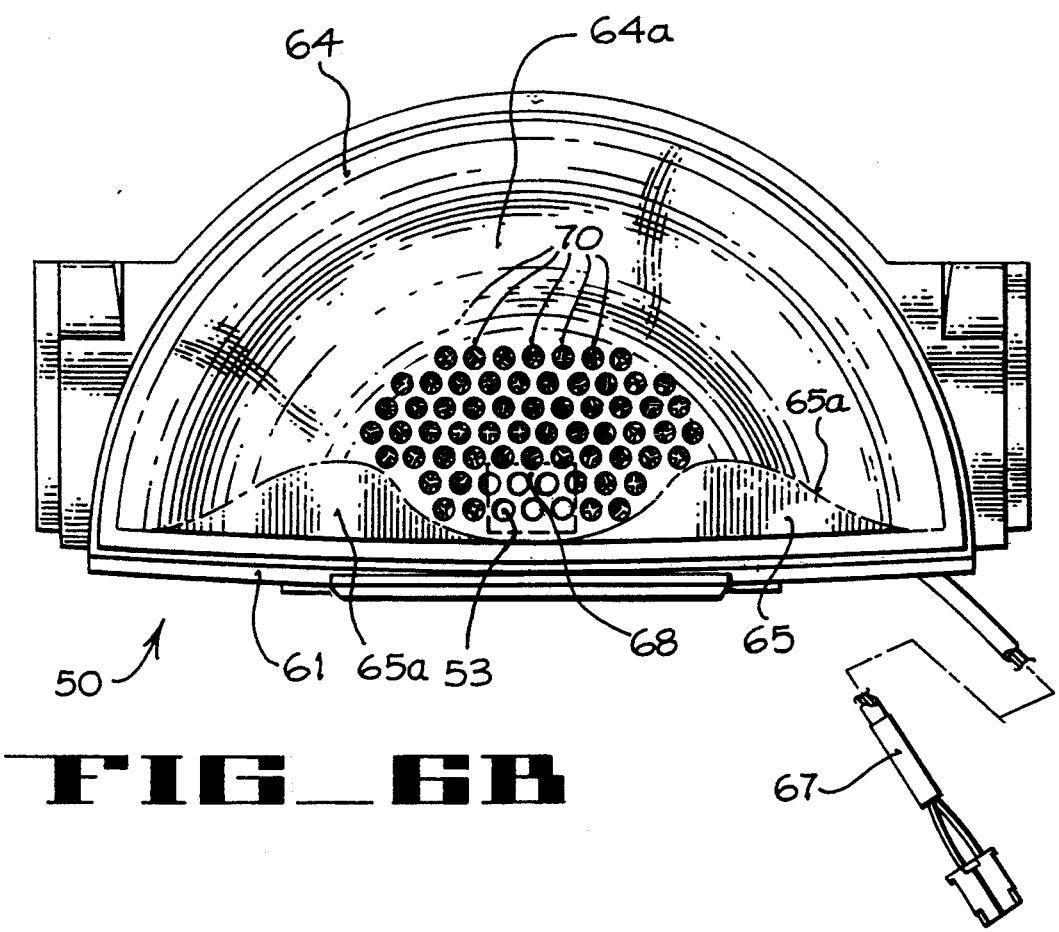
FIG_6B
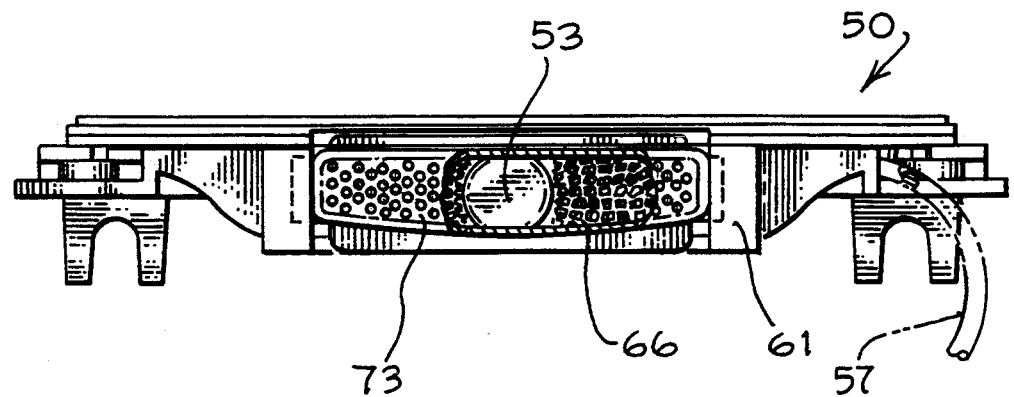
FIG_6C

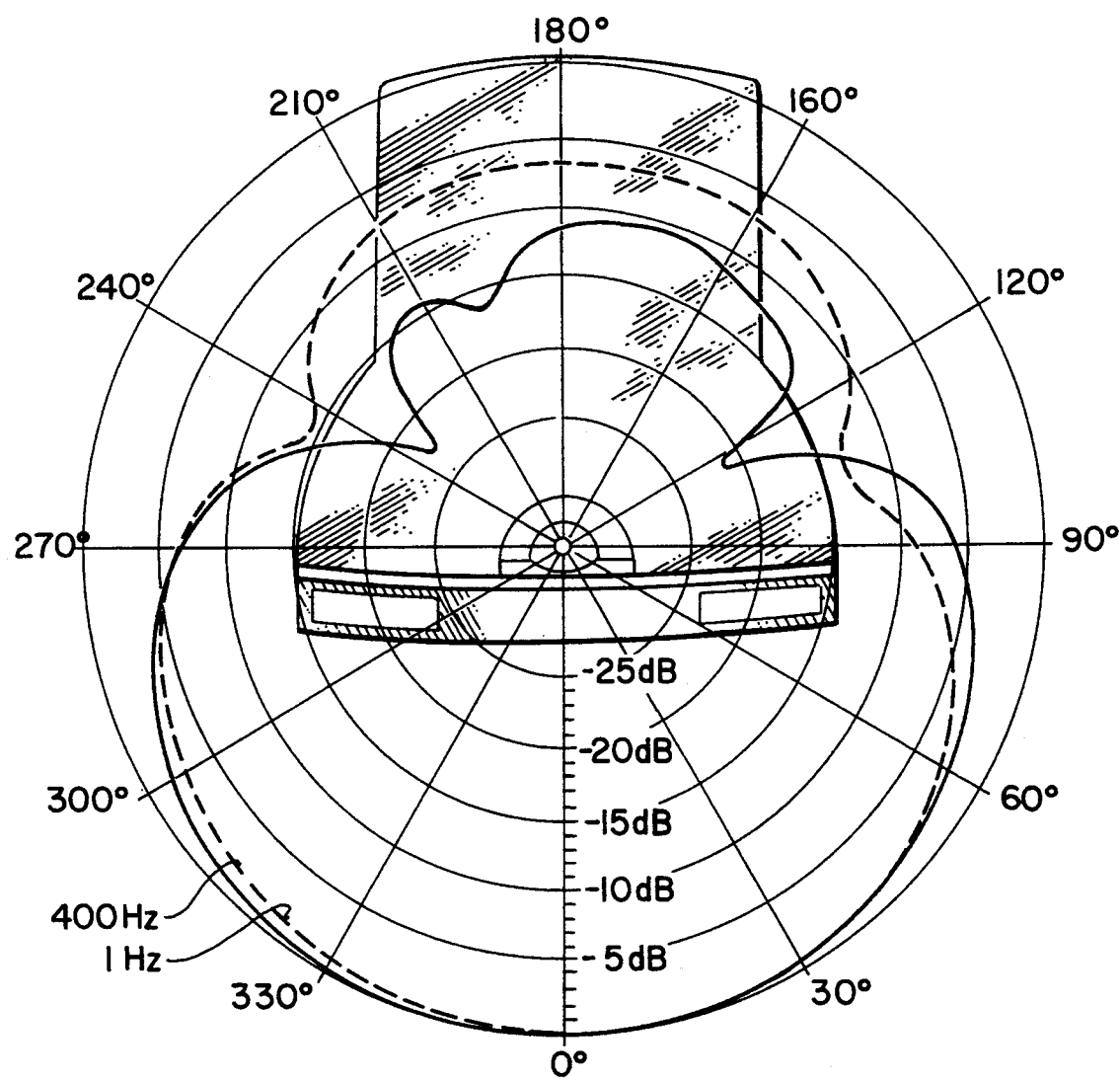
FIG_7

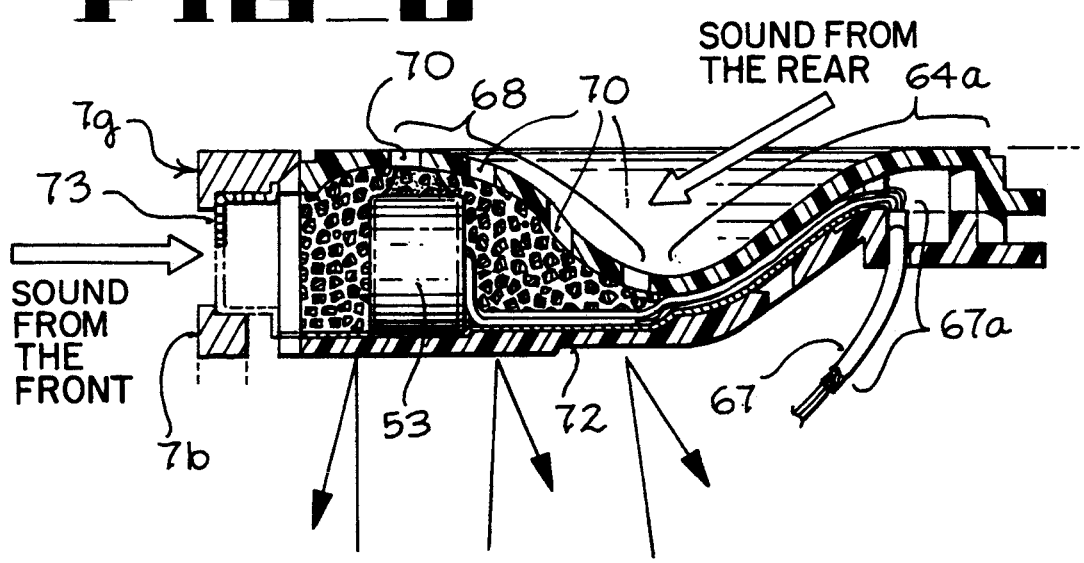

HIGH PERFORMANCE STEREO SOUND ENCLOSURE FOR COMPUTER VISUAL DISPLAY MONITOR AND METHOD FOR CONSTRUCTION

RELATED APPLICATIONS

The present invention is related to the following specifications filed concurrently with the application on which this patent is based: "Computer Visual Display Monitor with Stereo Speaker and Directional Microphone and Method for Construction", Ser. No. 08/082,682, filed Jun. 23, 1993; and, "Directional Microphone for Computer Visual Display Monitor and Method for Construction", Ser. No. 08/081,999, filed Jun. 23, 1993.

BACKGROUND OF THE INVENTION

1. Field of the Invention

The present invention relates generally to visual display devices. More particularly, the present invention relates to a computer visual display monitor having an integral stereo sound reproduction facility and an integral voice recognition microphone.

2. Art Background

Video displays are pervasively used as visual output devices for all types of computer systems. Most commonly, a cathode ray tube (CRT) is enclosed within a supporting enclosure together with associated subsystems such as CRT control circuits and power supplies to form a computer visual display unit commonly known as a monitor. The monitor is then coupled to receive video signals from a main processor unit including video control logic.

Prior art monitors have not heretofore incorporated high quality audio capability. In fact, prior art computer systems as a whole have only included minimal, low quality sound generation capabilities for limited purposes such as generating user prompt signals, system warning signals, and others. For example, most personal computer systems incorporate a small relatively low performance speaker to produce the above prompt and warning signals, usually comprising one or more low fidelity "beep" tones, or very simple synthesized speech phrases. In low performance audio applications, construction and placement of the speaker system usually is immaterial. In fact, in most personal computer systems the speaker is typically mounted to a bottom-, side-, or rear-facing panel of the computer enclosure, thus leaving the front panel of the enclosure free for user access to mass storage devices contained therein, or other user controls. Remote speaker placement is usually adequate for the above-mentioned prompt and warning signals because such sounds generated by computer systems typically comprise relatively narrow bands of sound without any significant low frequency (bass) components, and are played at low volume levels. When complex sounds such as voice and music are generated or played back through a low quality, arbitrarily positioned speaker, the resulting uneven frequency response severely restricts the utility of the sound system, which is otherwise adequate for simple warning tones.

More recently, with the advent of digital sound recording and processing techniques, the increased use of sound by computers within computing applications, as well as the need for high quality recording and reproduction of sound within personal computing systems, is desirable. However, despite substantial improvements in personal computing system performance in terms of numeric processing speed and visual display clarity, the recording and reproduction of high quality sound within computer systems have not enjoyed similar advancements. In other words, although modern digital recording techniques produce very high quality source material, the recreation of high quality sound from such recorded media within computing environments generally, and personal computing environments specifically, has been extremely poor in the prior art. The foregoing is principally due to the inability to generate high quality full frequency sound from a small panel-mounted speaker, as previously described in connection with personal computer systems. The audio reproduction problem is compounded even further when reproduction of high quality stereophonic sound is desired.

Although relatively high quality full frequency stereophonic sound has been integrated into television environments, such integration is fundamentally different from the application of high quality sound to computer visual display monitors. First, television images are generated by relatively low resolution analog signals, which images can be created on large dot pitch CRTs, i.e., where the illuminating phosphor dots are spaced further apart. By contrast, computer generated images, whether animated or sampled video signals, are significantly higher resolution digital images requiring much finer dot pitch CRTs. Typically, television CRTs employ what is known as a shadowmask to help direct the phosphor-exciting electrons to the appropriate phosphors. Shadowmasks are opaque sheets having as many holes as there are phosphors, which holes are usually grouped in 3's with space provided between the groups. Although completely adequate for most television viewing, shadowmasks are inherently performance limited: the hole spacing limits the ultimate resolution, and the mask itself blocks a significant percentage of total electron flux, thereby limiting the CRT's brightness. A few CRTs employ an alternative screening device known as an aperture grill, such as the Trinitron ® CRT manufactured by Sony Corporation. Trinitron ® CRTs employing aperture grills can be constructed in normal resolution as well as high resolution variants, and consist essentially of an arrangement of finely spaced wires which can be caused to vibrate at some resonant frequency. Unlike the larger, normal resolution aperture grills which resonate at a very low frequency or not at all, the smaller, high resolution aperture grills used in computer display monitors can have their resonant frequencies well within musical and ordinary listening frequencies. Accordingly, if a high quality stereophonic sound system is brought into sonic communication with a high resolution aperture grill having its natural frequency within the musical spectrum, the grill will vibrate and severely degrade visual image quality displayed on the CRT, usually manifesting itself as shimmering waves of darkness and brightness similar to Moiré interference. The foregoing image degradation usually is not encountered in lower resolution displays intended for television use for several reasons, including the fact that television images typically comprise non-static, non-uniform backgrounds. In contrast to typical television images, computer system images frequently include stationary, homogeneous shapes and colors, against which the image degradation due to aperture grill vibration is easily and noticeably seen. However, the aperture grill problem will have to be addressed when designing high resolution CRT display devices incorporating high quality sound reproduction systems, whether for computer environments or for the anticipated High Definition Television (HDTV) systems presently under design.

Finally, prior art computer systems are generally not constructed to facilitate recording of voice signals, in particular for purposes of speech recognition. Where facility for voice recording is provided in prior art systems, typically an external microphone must be maintained in close proximity to the speaker's mouth, for example by gooseneck extension or by a headset arrangement. Such microphone attachment effectively ties the user to the computer and restricts the user's movement. Alternatively in the prior art a microphone may be attached to an exterior surface of a computer system component such as the processor enclosure or the monitor. However, such external attachments typically result in non-optimal microphone performance, where directional characteristics of the microphone, if any are provided by its design, are arbitrarily modified by nearby reflecting surfaces and refracting edges. The result is that the ratio of the desired speech signal to undesired room noise and reflections is unacceptably degraded.

As will be described in the following detailed description, the present invention overcomes many of the limitations associated with prior art computer systems and visual displays by providing an integrated, high resolution, video display monitor incorporating high quality stereophonic sound generation facility as well as speech recognition differential microphone. A user of the present invention can use the integrated monitor of the present invention to display high quality graphics or video data accompanied by full frequency stereophonic sound without compromising the quality of the projected image. Furthermore, the integral directional microphone is positioned and optimized to receive and resolve human speech generated by the computer user, and to provide maximum cancellation of unwanted sounds. The signal from the microphone may then be used for many applications where clear pickup of speech is required, such as voice recognition, teleconferencing, and voice annotation.

SUMMARY OF THE INVENTION

A cathode ray tube (CRT) visual display monitor intended for personal computer systems and integrating a high quality stereophonic speaker system and a directional speech recognition microphone, and methods for construction of same, are disclosed. The CRT is contemplated to be of a high resolution type incorporating a comb-like vertical aperture grill having a natural frequency within the musical scale.

The stereo speaker system comprises a ported speaker enclosure within which are mounted two conventional speaker assemblies. A stereo audio amplifier and control unit for modifying the audio signals delivered to the speakers is mounted within the speaker enclosure. The speaker enclosure is internally mounted within the monitor such that the speakers mounted therein project sound in a direction towards the user facing the monitor. Further, the speaker enclosure is mounted with a minimum number of attachment members, which members include vibration isolation material to attenuate transmission of vibration components near the resonant frequency of the aperture grill when the speaker system is operating. The material, shape, and assembly method of the speaker enclosure are selected to reduce structural deformations contributing to airborne transmission of vibration to the aperture grill.

The integral directional microphone assembly comprises a pressure gradient electret microphone capsule located within a directional sensitivity-modifying microphone housing. The housing further comprises a microphone preamplifier, and is mounted internally within the monitor housing facing the user and adjacent to the top surface of the monitor housing. The microphone housing has a large frontal opening and a plurality of rearwardly facing openings which together enable differential sound pressures to be applied to the directional microphone capsule retained therein by acoustically transparent foam. The directional characteristics of the microphone assembly, when installed within the monitor housing, are optimized for maximum rejection of noise and undesired sounds.

BRIEF DESCRIPTION OF THE DRAWINGS

The present invention will be understood more fully from the detailed description given below and from the accompanying drawings of the preferred embodiment of the invention in which:

FIG. 1A is a perspective illustration of a cathode ray tube (CRT) high resolution video display monitor integrating a stereo speaker arrangement and a directional microphone arrangement according to the present invention being used in a typical personal computing environment.

FIG. 1B is an exploded view illustration of the high resolution CRT monitor shown in FIG. 1A, including a CRT having an aperture grill.

FIG. 2A is a front perspective view of the stereo speaker arrangement and a first vibration attenuating grommet.

FIG. 2B is a rear perspective view of the stereo speaker arrangement and a second vibration attenuating grommet.

FIG. 3A is a perspective view of the first vibration attenuating grommet.

FIG. 3B is a perspective view of the second vibration attenuating grommet.

FIG. 4 is an exploded view illustration of the stereo speaker enclosure of the present invention.

FIG. 5A illustrates the theoretical frequency response of structural and airborne vibrations transmitted from the speaker enclosure to the CRT/aperture grill.

FIG. 5B is an empirical plot of the audio frequency response of the speaker enclosure.

FIG. 6A is an exploded view perspective illustration of the directional microphone arrangement of the present invention.

FIGS. 6B-C are alternative top plan and front elevation views of the voice recognition microphone shown in FIG. 6A.

FIG. 7 is a polar plot of directional microphone spatial response relative to on-axis response at 400 Hz and 1 kHz.

FIG. 8 is a cross-sectional side view of the interior of the directional microphone illustrating the electrostatic shielding arrangement.

DETAILED DESCRIPTION OF THE INVENTION

The present invention discloses an integration arrangement for a cathode ray tube (CRT) high resolution visual display monitor intended for personal computer systems and integrating a high quality stereophonic speaker system and a directional microphone, and methods for construction of same.

In the following description, for purposes of explanation, specific numbers, times, dimensions, and configurations are set forth in order to provide a thorough understanding of the present invention. However, it will be apparent to one skilled in the art that the present invention may be practiced without these specific details. In other instances, well known systems are shown in diagrammatic or block diagram form in order not to obscure the present invention unnecessarily.

The Integrated Monitor

Reference is now made to FIG. 1, wherein is shown an exploded view illustration of an integrated, cathode ray tube (CRT) high resolution video display monitor 5 integrating a stereo speaker arrangement and a voice recognition microphone arrangement intended for personal computing environments. As shown in FIG. 1, monitor 5 comprises a housing 7 enclosing a high resolution CRT 8 of the type employing a vertical aperture grill 9 to direct an impinging electron beam (not shown) sourced from an electron gun 12 towards a multiplicity of screen phosphors 13 formed on an interior surface of a CRT screen 14. Unlike the more commonly employed perforation shadow mask (not shown) comprising an opaque shield having a large number of regularly spaced clusters of circular perforations aligned with the CRT phosphors 13, the aperture grill 9 comprises a comb-like structure having a large number of narrowly spaced wires 16 which vertically span the interior surface of screen 14. Wires 16 are aligned to CRT 8 such that electrons in the electron beam which pass between any two wires strike and illuminate the corresponding phosphors 13, the space between any two wires corresponding generally to the width of a phosphor. Alternatively, electrons which strike any wire 16 will not strike, and thus will not illuminate, a phosphor 13. In CRT 8, the wires 16 of aperture grill 9 are more closely spaced than the perforations in a shadow mask, and extend in a direction orthogonal to the horizontal scan direction of the electron beam. A widely known example of a CRT employing an aperture grill is the Trinitron® CRT manufactured by Sony Corporation. Trinitron® CRTs employing aperture grills can be constructed in normal resolution as well as high resolution variants.

As described, wires 16 of aperture grill 9 form a tuned mechanical system which has a resonant, or natural, frequency. The natural frequency depends upon the length, the diameter, and the spacing of the wires 16 comprising grill 9, as well as the size of the CRT screen 14. As practiced in the present invention, the aperture grill 9 of the high resolution Trinitron® CRT has its natural frequency within the audible spectrum near 440 hertz (Hz), equivalent to the musical tone middle "A". Other tunings are possible depending on materials and dimensions of the aperture grill being designed. Throughout this section, and for the balance of this detailed description, the present invention benefits from engineering features which minimize or preclude transmission of structural or airborne vibration from sound generation devices to CRT 8, and specifically to the aperture grill 9 within the CRT 8.

As shown in FIG. 1, housing 7 comprises a bottom panel 7a, a front panel 7b, side panels 7c and 7d, a back panel 7e, and a top panel 7f. Housing 7 is mounted upon and supported by a base 6 which includes a tilting and swiveling means 4 for adjusting housing 7 to any desired position for viewing depending on the user's preference. A ported stereo speaker enclosure 20, comprising a pair of conventional voice coil actuated cone speakers 21a and 21b mounted at laterally opposing ends of enclosure 20, is mounted inside housing 7 below CRT 8. As shown in FIG. 1, speaker enclosure 20 is located inside housing 7 directly behind front panel 7b and positioned above bottom panel 7a and between side panels 7c and 7d. Speaker enclosure 20 is mounted to housing 7 with an absolute minimum number of attachment points to minimize structurally transmitted vibration from the speaker enclosure 20 to aperture grill 9 within CRT 8. Details concerning the internal arrangement and construction of speaker enclosure 20 will be described more thoroughly below in the section entitled "Speaker Enclosure".

With reference to FIGS. 1A and 1B, attachment points are provided on enclosure 20 by identical first and second cylindrical bosses 22 and 23 extending outward from opposing distal ends of the enclosure 20, as well as an ovaloid tubular member 25 extending outward from an ovaloid opening 24 in the rear portion of enclosure 20. In an alternative embodiment, bosses 22 and 23 may be replaced with a pair of pin members or self-tapping screws (not shown) projecting through a locating opening (not shown) formed in a tab (not shown) extending from enclosure 20. As shown in FIG. 1A, bosses 22 and 23 are solid members with no porting functionality. In FIG. 1B, tubular member 25 is shown to have a flanged portion 25a at the end of a tube shaft 25b, and in addition has an open volume 25c disposed within the interior of shaft 25b. Flanged portion 25a of member 25 is commensurately larger than the cylindrical bodies of bosses 22–23, due to the presence of the open volume 25c defined within shaft 25b. The function of tubular member 25 is two-fold. Firstly, member 25 serves as an attachment point for the posterior portion of the speaker enclosure 20 to the monitor enclosure 7. Secondly, opening 24 fitted with tubular member 25, specifically volume 25c within shaft 25b, comprises a tuned port through which air may pass as necessary in connection with motion by the speaker cones of speakers 21a and 21b, as is generally known in the design and construction of speaker systems. Acoustic aspects and other associated functionality of the port provided by opening 24 and tubular member 25 will be discussed in more detail below in connection with the speaker enclosure itself. For present purposes, tubular member 25 comprising the tuned port may be acoustically defined in terms of a characteristic natural frequency $f_p$.

Over each of the cylindrical diameters of each of the bosses 22 and 23, and over the ovaloid diameter of tubular member 25, is fitted an elastomeric grommet 27a, 27b, and 27c, respectively, formed of an energy dissipative material specified to absorb vibration components near the natural frequency of aperture grill 9, and principal harmonics thereof. Analogously to tubular member 25 described above, elastomeric grommets 27a and 27b may be acoustically defined in terms of a characteristic natural frequency $f_{g1}$, whereas elastomeric grommet 27c may be acoustically defined in terms of a characteristic natural frequency $f_{g2}$. The elastomeric grommets 27a–c are formed of any suitable commercially available vibration damping material such as IsoLoss or C-1002. In one embodiment, grommets 27a–c are fabricated of chlorobutyl rubber, manufactured by Exxon Corporation.

Reference is now made to FIGS. 2 and 3. In FIG. 2, grommets 27a and 27b are identical and are shown in perspective view, each grommet 27a and 27b having an annular groove 28 extending around an external circumference 29a centered between two planar faces 30a and 30b. Further, grommets 27a and 27b have an internal circumference 29b dimensioned to conform snugly over either boss 22 or 23, internal circumference 29b further comprising a first multiplicity of rib members 31. As shown, rib members 31 minimize contact area between grommets 27a–b and bosses 22–23 and stiffen the grommet material contacting the boss 22 or 23. Every other one of rib members 31 extends beyond the planar faces 30a and 30b of the grommet, thereby forming vibration absorbent cushions 31a which provide vibration attenuation in an axial dimension. Rib members 31 minimize total contact area between grommets 27a–b and bosses 22–23, and stiffen the grommet material contacting the boss 22 or 23 when enclosure 20 is mounted to the housing 7. The combined effect of contact area reduction and material stiffening reduces the conduction path for mechanically transmitted structural vibrations produced by speakers 21a and 21b within the speaker enclosure 20 from reaching the aperture grill 9. In FIG. 3, grommet 27c is shown in perspective view to comprise an ovaloid body 32 having an internal circumference 32a conformally extending over the shaft portion 25b of tubular member 25. Moreover, grommet 27c is shown to have an external circumference 32b, there being an annular flange-like structure 32 bounding one side of a cylindrical body 32. A second multiplicity of rib members 33 is distributed at regular intervals on external circumference 32b. As in the case of grommets 27a and 27b shown in FIG. 1a, the rib members 33 formed on external circumference 32b of elastomeric grommet 27c generally serve to minimize total contact area between the support point at the rear of speaker enclosure 20, namely opening 24, and housing 7, thus ensuring that structural vibrations sourced from the speaker enclosure 20 are effectively interdicted prior to adversely affecting the aperture grill 9 within the high resolution CRT 8. Importantly, the size and number of first and second pluralities of rib members 31 and 33 are adjusted so that the natural frequencies of the several grommets (27a–27c) are the same as each other as well as the natural frequency of tubular member 25, i.e., where $f_p = f_{g1} = f_{g2}$.

Referring now to FIGS. 1–3 inclusively, mounting of speaker enclosure 20 into housing 7 will be described. When speaker enclosure 20 is moved into position above bottom panel 7a and between side panels 7c and 7d, the bosses 22 and 23 fitted with elastomeric grommets 27a and 27b, are respectively received into a pair of complementary slotted sockets 33a and 33b respectively formed in the side panels 7c and 7d of housing 7. At the same time, the flanged portion 25a of tubular member 25 is received into a socket 33c formed in rear panel 7e of housing 7. The elastomeric grommet 27c fitted to the shaft 25b of tubular member 25 is thereby seated within opening 24 in enclosure 20. Slotted sockets 33a and 33b bear against the annular grooves 28 of each of the respective elastomeric grommets 27a and 27b, and partially compress the compliant material so as to secure the grommets, and thus the bosses 22 and 23, within the slotted socket region. The speaker enclosure 20 is thus retained within housing 7 with only three support points: one at each of the distal ends of the speaker enclosure 20 (bosses 22 and 23), and one at the rear of the enclosure 20 (opening 24).

With respect to grommets 27a, 27b, and 27c, the desired degree of vibration isolation between enclosure 20 and housing 7 is achieved by compressively loading the grommets within their respective attachment points, namely socket regions 33a and 33b for grommets 27a and 27b, and opening 24 for grommet 27c. At room temperature, the elastomer material forming grommets 27a–b experiences a 10 dB/octave rolloff from a cutoff frequency of approximately 140 Hz. In the present embodiment of the invention, with an approximate speaker enclosure load (weight) of about 4 pounds force (lbf), vibration transmission through grommets 27a, 27b, and 27c loaded to approximately 1.3 lbf each will attenuate vibrations at the expected 10 dB per octave from a natural frequency of approximately 100 Hz. It should be noted that structural vibration generated within speaker enclosure 20 is substantially reduced at higher frequencies before being channeled through the attachment points, namely grommets 27a–c into housing 7. Accordingly, the aperture grill 9 having its natural frequency near 440 Hz is substantially isolated from the vibration source of enclosure 20.

Still referring to FIG. 1, the integrated monitor housing 7 of the present invention further comprises an internal, directional microphone unit 50 intended principally to pick up speech for applications requiring optimal fidelity in reproduction. As shown in FIG. 1, microphone unit 50 is mounted in housing 7 so as to be directly accessible to speech emanating from a user seated before monitor 5, and also to be centrally located near the juncture of front panel 7b and top panel 7f. Microphone unit 50 is mounted within housing 7 by any appropriate system of snaps and hooks, screws, rivets, or other generally known method. Vibration and noise isolation of the microphone unit 50 is achieved by use of insulative materials and shielding, as is also described below.

The upper-central location of the microphone unit 50 is selected for several reasons. First, the elevated location places the microphone unit 50 as nearly as possible in the direct path of speech sound waves sourced from a user who is speaking. Second, the location adjacent to top panel 7f enables microphone unit 50 to be enclosed in a housing having apertures optimized to admit sound waves from all directions, so that the pressure gradient vector relationships between these sound waves are preserved and the rejection of sounds arriving from the sides and rear can be improved. Thirdly, the elevated location allows the microphone unit 50 to be positioned such that off-axis nulls in its directional response pattern are oriented to face common sources of undesired noise such as keyboards, disk drives and cooling fans in computer enclosures. As shown in FIG. 7 below, by directing the off-axis nulls towards sources of unwanted sound, the undesired noise components are reduced in microphone total output. Each of the above considerations is discussed in more detail below in the section entitled "Integrated Microphone".

The Speaker Enclosure

Reference is now made to FIG. 4 wherein is illustrated an exploded perspective view of the ported speaker enclosure 20 of the present invention. In FIG. 4, speaker enclosure 20 comprises upper and lower halves 40a and 40b formed substantially as shown of a rigid and dense material. Upper half 40a includes two extended angulated surfaces 42a and 42b each having a circular cutout 43a and 43b dimensioned to receive speakers 21a and 21b. Speakers 21a and 21b are positioned upon surfaces 42a and 42b such that the associated voice coils and cone spiders (not shown) extend through cutouts 43a and 43b. As a result, speakers 21a and 21b are substantially flushly mounted against surfaces 42a and 42b, thereby permitting speaker enclosure 20 to be positioned immediately behind the lower portion of front panel 7b when mounted within housing 7.

As shown in FIG. 4, the interior surfaces of upper and lower halves 40a and 40b each comprise a multiplicity of integral, orthogonally extending ribs 41a and 41b to enhance the structural strength of the respective halves. In particular, it is desirable that sonic energy derived from speakers 21a and 21b causing air movement within the ported enclosure 20 does not create structural deformations sufficient to generate airborne transmitted vibrations within housing 7 which can stimulate aperture grill 9 to vibrate at its resonant frequency. Empirical testing of the present embodiment indicates that as much as two thirds of the total vibration induced in the integrated monitor is due to airborne transmission, with only one third due to structural transmission. Ribs 41a–b enhance the flexural rigidity of the halves 40a–b. Flexural deformation is further avoided by using as stiff material as possible for halves 40a and 40b. Structural plastics such as ordinary ABS or polycarbonate, while generally adequate, were found to be too deformable for the present application. Accordingly, the material selected to fabricate enclosure halves 40a–b comprises a glass-filled PVC having approximately three times the flexure modulus and 1.3 times the density of ordinary PVC, for example FiberLock 812GR30, supplied by Geon Company, 6100 Oak Tree Blvd., Cleveland, Ohio 44131. By using a very dense and stiff material for upper and lower halves 40a and 40b, enclosure 20 can be made stiff yet have a lower natural frequency than would otherwise be obtainable using ordinary structural plastics.

Moreover, as shown in FIG. 4, upper and lower halves 40a and 40b comprise a multiplicity of surface contours and seams where contours meet. The surface topology of enclosure 20 as defined by the upper and lower halves is dictated in part by the need to conform to the available internal volume of monitor housing 7 wherein which enclosure 20 is mounted, and in part by the need to increase the overall stiffness of the enclosure 20. As presently practiced, halves 40a and 40b have a thickness of approximately 4 millimeters (mm), yielding a very stiff, yet moldable, enclosure.

Tubular member 25, in addition to comprising a point of attachment for the enclosure 20 as previously described, also operates in concert with opening 24 to achieve a porting function in connection with the audio characteristics of speaker enclosure 20. Specifically, enclosure 20 is a ported enclosure of the type well known in art of speaker construction to enhance low frequency response. In order to achieve full spectrum response in the present invention, that is, to permit long wavelength low frequencies to exit enclosure 20 and contribute to the total audio spectrum emanating from the speaker enclosure, the port must be dimensionally tailored to the specific performance criteria desired to be realized for the particular speaker enclosure being designed. In the present invention, tubular member 25, and particularly shaft 25b and flanged portion 25a, when fitted within opening 24 comprise a tuned port in accordance with generally recognized design principles of bass-reflex speakers which may be defined in terms of a characteristic natural frequency.

The ported speaker enclosure 20 functionally facilitates longer wavelength, lower frequency sound waves to be emitted from the rear of enclosure 20, and thus from housing 7, in a specific phase relationship with the sound waves emitted from the front of enclosure 20 through openings (not shown) in bottom panel 7a. Specifically, sound waves emanating from bottom panel 7a are reinforced by addition rather than reduced by cancellation. Two benefits are readily gained thereby. First, mechanical vibration associated with the lower frequency sounds is not coupled into enclosure 20 or housing 7, thereby isolating aperture grill 9 from the longer wavelength higher energy waves. Second, by projecting the low frequency sounds from tubular member 25 at the rear panel 7e of monitor housing 7, the lower bass frequencies are not absorbed or distorted within either the speaker enclosure 20 or monitor housing 7, but rather are emitted in the correct phase to be added to the total sound generated by speaker enclosure 20. Superior acoustic performance is achieved thereby, in particular extended low frequency response compared with a similar speaker enclosure having no tuned port.

Continuing now to refer to FIG. 4, between upper and lower halves 40a and 40b is located a printed circuit board (PCB) 44 comprising an audio control and amplifier unit 45 for controlling the operation of speakers 21a and 21b. In particular, audio control and amplifier unit 45 enables the user to provide audio signal processing algorithms including psychoacoustic sound shaping techniques known in the art to broaden the sound stage to and to alter the apparent source of the audio signals for the user, for example "elevating" the perceived source of sound or compensating for nonlinear acoustic sensitivities in a listener.

Upper half 40a also comprises a centrally located, rectangular polygon cutout 46 corresponding to a region of PCB 44 where a speaker system wiring bundle (not shown) is coupled to one or more connectors (not shown) on the PCB. The balance of audio processing components (not shown) comprising audio control and amplifier unit 45 are positioned on PCB 44 such that they are enclosed within speaker enclosure 20. Locating of the audio processing components, and particularly the output level amplifiers, within the enclosed volume of enclosure 20 takes advantage of scavenging airflow through the port (tubular member 25) associated with air movement caused by speakers 21a and 21b as the cone elements of each speaker translate forward and backward. That is, the air movement into and out of enclosure 20 through the port (member 25) when speakers 21a and 21b are operating provides forced-air cooling for heat-producing devices located within the enclosed volume. Accordingly, more audio output power can be developed without need for typical forced or passive cooling devices such as fans and or ventilation openings.

In the present invention, maximum forced-air cooling is obtained within the speaker enclosure 20 at the most opportune time, namely at maximum power output of audio control and amplifier unit 45 positioned on PCB 44. Because the speaker cone must move more air to create louder sounds, the speaker cone must be driven a commensurately longer distance by its associated electromagnetic voice coil. The greater the distance the voice coil must move, the greater the current and power draw from the amplifier unit 45 will be. The greater air movement, in turn, creates the airflow within enclosure 20, which airflow will draw away heat from any heat-producing devices within the enclosure.

Referring now briefly to FIGS. 5A and 5B, empirical frequency response data for speaker enclosure 20 are shown. In FIG. 5A, transmissibility of vibration through the elastomer grommets 27a, 27b, and 27c is shown for increasing frequency. After an initial rise at the natural frequency of the grommet, the transmissibility is seen to decline at the expected 10 dB/octave. In FIG. 5B, total acoustic frequency response is shown for increasing frequency.

The Integrated Microphone

Referring now to FIG. 6A, an exploded perspective view of the integral, directional microphone unit 50 of the present invention is illustrated. As previously set out, integral microphone unit 50 is designed principally to record spoken words for applications requiring optimal fidelity in reproduction, and to reject signals emanating from sources not in front of the monitor 5. The present invention is implemented so that microphone unit 50 will function as a directional, pressure gradient microphone, producing a hypercardioid spatial response characteristic and having a linear frequency response in the range of human speech. As practiced, microphone unit 50 generates a hypercardioid response characteristic having a flat on-axis response in front, with sharp rejection laterally leading to two off-axis nulls towards the rear. The response can be modeled as:

$$r = 0.3 + 0.7 \cos\theta$$

where 0.3 comprises a pressure term, 0.7 comprises a pressure gradient term, and $\theta$ is the angular displacement in an azimuth plane away from a colinear microphone axis extending through the microphone housing, shown graphically in FIG. 7. The desirability of the above response characteristic was ascertained from empirical evidence derived from voice recognition algorithm development, as well as the design goal of reducing as much as possible the microphone's random energy efficiency. The hypercardioid pattern results in the highest directivity, i.e. the lowest random energy efficiency, of any first-order pressure gradient microphone. Most notably, the above response characteristic was achieved by placing cardioid capsule 53 inside microphone unit 50, and locating unit 50 at an external surface discontinuity of housing 7.

The principal feature of the integral microphone of the present invention is that the placement of the microphone unit 50 containing the cardioid capsule 53 at an exterior vertex 7g formed at the juncture of front panel 7b and top panel 7f enhances the directionality of capsule 53, thereby substantially reducing sensitivity to off-axis undesired sounds. Generally, placing a microphone on a solid surface will cause pressure doubling at the microphone for wavelengths which are short compared to the dimensions of the object on whose solid surface the microphone is placed. Modification of the sound entry paths (e.g., opening 63, FIG. 6A, or openings 70, FIG. 6B, described below) to pressure gradient microphones such as capsule 53 of the present invention, will cause deviations in the inherent directionality and frequency response of the microphone. Both the placement and entry path techniques are used in the present case. Microphone capsule 53 is constructed to have a cardioid directional pattern, having a single null at 180° in azimuth from 0° (on-axis) centerline. Placing microphone unit 50 at the vertex 7g of monitor 5, and the modification of the sound pressure and pressure gradient response of the microphone by the use of selectively perforated housing 50 result in a directional pattern which is not cardioid, but rather is hypercardioid.

As shown in FIG. 6A, microphone unit 50 comprises upper and lower halves 60a and 60b enclosing conventional pressure gradient electret microphone capsule 53. Upper and lower halves 60a and 60b each comprise a linear front edge 61 and a circular rear edge 62. A generally rectangular opening 63 is formed in front edge 61 of lower half 60b, opening 63 defining a front portion of unit 50. Upper half 60a comprises a top surface 64 further comprising a subsided region 64a formed therein, region 64a commencing from a lower edge 65a of an angulated surface 65 which adjoins linear edge 61. Subsided region 64a extends rearwards in a direction away from opening 63 towards the circular rear edge 62 of upper half 60a. As subsided region 64a extends rearward, it rises smoothly to meet top surface 64 at the rear edge 62 of upper half 60a. Capsule 53 is retained within the subtended volume between upper and lower halves 60a and 60b by acoustically transparent foam 66. A coaxial signal and ground lead 67 extends from capsule 53 through foam 66 and exits from unit 50 at a point between circular edges 62 of upper and lower halves 60a and 60b.

With reference to FIGS. 6A and 6B, a rearwardly facing convex swell 68 is formed in the central region of angulated surface 65 and smoothly merging into the subsided region 64a of top surface 64. Formed in convex swell 68 is a evenly distributed multiplicity of circular openings 70. Circular openings 70 are formed in such a manner as to be acoustically accessible from the rear of microphone unit 50, that is, in a direction extending from circular rear edges 62 toward convex swell 68. More particularly, openings 70 are intended to receive undesired sound waves from sources other than in front of housing 7. The smooth topologies of subsided region 64a and convex swell 68 are intended to minimize or avoid sharp boundary transitions which will cause reflected sound waves to diffract and potentially interfere. As is well known in the art, pressure gradient microphones such as cardioid capsule 53 are dependent for their inherent directional characteristics on the pressure gradient between openings in at least two of their external surfaces, for example front and side. In the present invention, subsided region 64a, being generally lower than the openings 70 formed in convex swell 68, inherently enables sound waves from the surrounding acoustic environment to be directed back into microphone capsule 53. Specifically, in the present configuration extraneous sound waves are channeled to a rearward facing opening 54 in a rear surface of capsule 53. The entire structure of microphone unit 50 is designed to allow controlled access of the pressure component of sound waves to capsule 53, and to preserve as nearly as possible the pressure gradient (i.e., velocity) of the sound waves so as to be sensed by capsule 53.

In an ordinary office environment, undesired sounds impinge on microphones from all directions. It is therefore the goal of the present invention to reduce the overall pickup of undesired sounds in the whole space surrounding the monitor 5 as much as possible, while maintaining fidelity of transmission for sounds arriving from the user (e.g., speech). The known figure of merit for the overall pickup selectivity of microphones is their directivity index or random energy efficiency, $$REE = \frac{1}{4\Pi} \int_0^{4\Pi} f^2(\theta) d\Omega_\theta$$

where $f(\theta)$ is the ratio of voltage output for incidence at angle $\theta$ to that for $\theta=0$, and $d\Omega_\theta$ is the element of solid angle at angle $\theta$.

Lower REE values indicate lower pickup of surrounding sounds. An omnidirectional microphone has an REE of 1, while a conventional cardioid microphone such as capsule 53 has an REE around 0.33. The lowest REE that is achievable with a first order pressure gradient differential microphone is around 0.25 for the hypercardioid pattern. It was accordingly an object of this invention to implement the hypercardioid pattern in the microphone, which has a polar response in an azimuth plane which can be described by the equation $$r=0.3+0.7 \cos\theta.$$

Although the non-zero response of the hypercardioid pattern at $\theta=180°$ (i.e. directly behind the monitor) may initially appear problematic, in ordinary office environments sounds arriving from behind the monitor 5 are typically attenuated because no nearby noise sources typically exist there.

In the present invention, microphone unit 50 makes use of the mechanical design of its housing structure as described above, acoustic foam 66 and an acoustic grill 73 to modify the directional response of microphone capsule 53 from its inherent cardioid polar response to the desired hypercardioid polar response. The acoustic foam 66 also comprises a shock mount for the microphone capsule 53, as well as providing isolation from structural borne vibration. Total acoustic resistance can be adjusted by adjusting the density of the foam, the number of holes, the size of holes, etc., as measured by any of several standard units: IFD (indent force deflection), PPI (perforations per inch), as is generally known.

In any application involving CRTs, noise immunity of certain devices must be considered, especially where low level signals are transmitted in an otherwise high level environment. For example, both magnetic and electrostatic noise from CRT could potentially be coupled into the microphone unit 50. However, in the present invention, because the microphone capsule 53 within microphone unit 50 is placed at the front exterior vertex 7g of housing 7, the only significant noise contribution is due to electrostatic noise. In this regard, placement well away from the yoke assembly (12, FIG. 1A) precludes need for more elaborate and costly (e.g., mu-metal) shielding techniques. With brief reference to FIGS. 6A and 10, adequate electrostatic shielding is accomplished In the present invention with only a sheet of copper foil 72 fitted to the bottom half 60b, which copper foil 72 is made to contact the ground braid of the coaxial signal lead at a crimp point when upper and lower halves 60a and 60b are joined. The braid is grounded. Microphone output signals travel in the center conductor of the coaxial lead 67, which also provides power to the microphone capsule 53 which contains a field effect transistor impedance converter stage, as is known in the art.

Finally, as a design requirement, microphone enclosure 50 must be manufacturable from cost and tooling considerations, and yet be sufficiently robust to withstand expected wear and tear while monitor 5 is in use. Although a thin, fine mesh metallic screen would be superior acoustically, such a material employed as top surface 63 would be extremely fragile in an ordinary work environment. Accordingly, as embodied in the present invention, both upper and lower halves 60a and 60b are formed of 1.5 mm thick PVC plastic which readily is moldable in to the required shaped for top surface 63. In the present embodiment, openings 70 have 2 mm diameters and 3 mm spacing empirically derived to be as optimally transparent as possible for the frequency range encountered in human speech. Given that the thickness of top surface 63, including convex swell 68 will cause some interference of the sound waves entering microphone unit 50 through openings 70, the output signal from microphone enclosure 50 will be reduced. Where thinner materials are appropriately used, top surface 63 can be made more acoustically transparent, thus yielding a better output signal.

SUMMARY

The foregoing has described a CRT visual display monitor of the type incorporating a high resolution aperture grill intended for personal computer systems, and integrating a high quality stereophonic speaker system and a directional microphone optimized for pick up of human speech, and methods for construction of the monitor. Although the foregoing has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

We claim:

1. In a high resolution visual display monitor comprising a cathode ray tube (CRT) including an aperture grill having a first natural frequency substantially within a musical bandwidth, wherein said monitor is coupled to receive a plurality of video and audio signals from a central processor unit within a digital information processing system, a stereo sound system comprising:

a hollow body subtending an enclosed volume;
said hollow body further comprising a rigid unit including a first plurality of intersecting rib members for resisting deformation of said hollow body;
an audio speaker arrangement affixed to said hollow body, said audio speaker arrangement coupled to receive said audio signals and generating in response thereto a plurality of sound waves;
a tuned port formed within said hollow body and having a second natural frequency less than said first natural frequency of said aperture grill and exhausting a band of selected low frequency sound waves from said hollow body;
and
a plurality of vibration isolation members seated on a corresponding plurality of isolation-mounting surfaces formed in said hollow body and compressively disposed between said hollow body and said monitor when said hollow body is mounted within said monitor;

said vibration isolation members having a third natural frequency substantially equivalent to said second natural frequency and substantially vibrationally isolating the audio speaker arrangement from the aperture grill.

2. The stereo sound system according to claim 1, wherein said vibration isolation members comprise first and second cylindrical side grommets and an ovaloid rear grommet, said side grommets each comprising an interior circumference having a second plurality of rib members disposed thereon, said rear grommet comprising an exterior circumference having a third plurality of rib members disposed thereon.

3. The stereo sound system according to claim 2, wherein said first natural frequency is at least twice said second and third natural frequencies.

4. The stereo sound system according to claim 1, wherein said tuned port comprises a tuned resonator wherein said second natural frequency is less than 100 Hertz.

5. The stereo sound system according to claim 1, wherein said hollow body consists essentially of glass-filled polyvinyl chloride (PVC).

6. The stereo sound system according to claim 1 further comprising a sound processor unit for receiving said audio signals and modifying said audio signals.

7. The stereo sound system according to claim 6, wherein said sound processor unit comprises a sound processor board mounted internally within said hollow body, said sound processor board comprising:
    an amplifier for increasing sound levels of said audio signals to be reproduced by said audio speaker arrangement;
    and
    a sound controller for inducing a plurality of psychoacoustic characteristics in said audio signals supplied to said speakers.

8. The stereo sound enclosure according to claim 7, wherein said sound processor board mounted internally within said speaker enclosure is cooled by air passing through said port and into said speaker enclosure when said speakers are active.

9. In a high resolution visual display monitor comprising a cathode ray tube (CRT) including an aperture grill having a first natural frequency substantially within a human hearing, wherein said CRT is coupled to receive a plurality of video and audio signals from a central processor unit within an audio-visual information processing system, a method for supporting a stereo sound system within said monitor comprising the steps of:
    providing a hollow body subtending an enclosed volume;
        said hollow body further comprising a rigid unit including a plurality of intersecting rib members for resisting deformation of said hollow body;
    coupling a plurality of audio speakers to said hollow body, said audio speakers coupled to receive said audio signals and generating a plurality of sound waves;
    forming a tuned port within said hollow body and having a second natural frequency less than said first natural frequency of said aperture grill and exhausting a band of selected low frequency sound waves from said hollow body;
    and
    mounting a plurality of vibration isolation members having a third natural frequency substantially equivalent to said second natural frequency on a corresponding plurality of isolation-mounting surfaces formed in said hollow body and maintaining
    said vibration isolation members in a state of compression between said hollow body and said monitor such that
    said vibration isolation members substantially vibrationally isolate the audio speaker arrangement from the aperture grill.

10. The method according to claim 9, wherein said vibration isolation members comprise first and second cylindrical side grommets and an ovaloid rear grommet, said side grommets each comprising an interior circumference having a plurality of rib members disposed thereon, said rear grommet comprising an exterior circumference having a plurality of rib members disposed thereon.

11. The method according to claim 10, wherein said rib members disposed on said interior circumference of said side grommets and said rib members disposed on said exterior circumference of said rear grommet support said sound enclosure within said visual display monitor only along coaxially extending apexes of said rib members.

12. The method according to claim 9, wherein said first natural frequency is at least twice said second and third natural frequencies.

13. The method according to claim 12, wherein said hollow body consists essentially of glass-filled polyvinyl chloride (PVC).

14. The method according to claim 9, further comprising the step of providing a sound processor unit coupled to receive said audio signals and modifying said audio signals.

15. The method according to claim 14, wherein providing said sound processor unit comprises mounting a sound processor board internally within said hollow body, said sound processor board comprising:
    an amplifier/or increasing sound levels of said audio signals to be reproduced by said audio speakers;
    and
    a sound controller for inducing a plurality of psychoacoustic characteristics in said audio signals supplied to said audio speakers.

* * * * *